United States Patent [19]

McGregor et al.

[11] Patent Number: 5,429,869
[45] Date of Patent: Jul. 4, 1995

[54] COMPOSITION OF EXPANDED POLYTETRAFLUOROETHYLENE AND SIMILAR POLYMERS AND METHOD FOR PRODUCING SAME

[75] Inventors: Gordon L. McGregor, Landenberg, Pa.; Raymond B. Minor, Elkton, Md.; William P. Mortimer, Jr., Conowingo, Md.; Daniel E. Hubis, Elkton, Md.

[73] Assignee: W. L. Gore & Associates, Inc., Newark, Del.

[21] Appl. No.: 23,642

[22] Filed: Feb. 26, 1993

[51] Int. Cl.⁶ .................................................. D02G 3/02
[52] U.S. Cl. ...................................... 428/364; 521/56; 521/59; 521/138; 428/373; 428/376; 428/379; 428/372; 606/231; 57/903; 57/905; 57/907; 2/275; 8/130.1; 264/343
[58] Field of Search .................... 521/56, 59, 138; 428/364, 373, 376, 379, 372; 606/231; 57/905, 907, 903; 8/3, 12

[56] References Cited

U.S. PATENT DOCUMENTS

| | | | |
|---|---|---|---|
| 3,615,972 | 10/1971 | Morehouse, Jr. | 156/79 |
| 3,953,566 | 4/1976 | Gore | 264/210 R |
| 4,098,945 | 7/1978 | Oehmke | 428/327 |
| 4,108,806 | 8/1978 | Cohrs et al. | 521/54 |
| 4,153,661 | 5/1979 | Ree et al. | 264/120 |
| 4,273,806 | 6/1981 | Stechler | 427/119 |
| 4,304,713 | 12/1981 | Perelman | 264/45.9 |
| 4,373,519 | 2/1983 | Errede et al. | 128/156 |
| 4,483,889 | 11/1984 | Andersson | 427/389.9 |
| 4,663,095 | 5/1987 | Battais | 264/45.9 |
| 4,837,251 | 6/1989 | Okey et al. | 523/218 |
| 4,946,737 | 8/1990 | Lindeman | 428/283 |
| 4,959,395 | 9/1990 | Janda | 521/54 |
| 4,985,296 | 1/1991 | Mortimer | 428/220 |
| 4,990,544 | 2/1991 | Asaumi et al. | 521/145 |
| 4,996,097 | 2/1991 | Fischer | 428/220 |
| 5,023,279 | 6/1991 | Buckmaster et al. | 521/85 |
| 5,026,591 | 6/1991 | Henn et al. | 428/198 |
| 5,061,561 | 10/1991 | Katayama | 428/364 |
| 5,110,998 | 5/1992 | Muschiatti | 174/24 |
| 5,115,103 | 5/1992 | Yamanishi et al. | 174/24 |
| 5,128,175 | 7/1992 | Yamanishi et al. | 427/54.1 |
| 5,155,138 | 10/1992 | Lundqvist | 521/76 |
| 5,209,967 | 5/1993 | Wright et al. | 428/283 |
| 5,238,621 | 8/1993 | Hagen et al. | 264/45.3 |
| 5,292,578 | 3/1994 | Kölzer | 428/240 |

FOREIGN PATENT DOCUMENTS

| | | |
|---|---|---|
| 160312 | 6/1990 | Japan . |
| 135582 | 5/1991 | Japan . |
| 167563 | 6/1991 | Japan . |
| 196991 | 7/1991 | Japan . |
| 3198856 | 7/1991 | Japan . |
| 313737 | 10/1991 | Japan . |
| 4335044 | 11/1992 | Japan . |
| 1589022 | 7/1981 | United Kingdom . |
| 9300163 | 1/1993 | WIPO . |
| 9301390 | 1/1993 | WIPO . |

OTHER PUBLICATIONS

"Microcellular Foams", Plastics Technologies (Feb. 1993).
Expancel-Advertisement of Nobel Industires Sweden (Apr., 1991).
Polymer Report—K. L. Alderson and K. E. Evans—"The Fabrication of microporous polyethylene having a negative Poisson's ratio" 33 Polymer 4435–4438 (1993).

Primary Examiner—Morton Foelak
Assistant Examiner—R. F. Johnson
Attorney, Agent, or Firm—David J. Johns

[57] ABSTRACT

The present invention provides improved compositions of expanded polytetrafluoroethylene (PTFE) and similar polymers and methods for forming and using such compositions. In its preferred embodiment, the present invention employs a mixture of PTFE and expandable thermoplastic microspheres. Through application of an energy source to the mixture, a coherent three dimensional expansion of PTFE can be achieved. The expanded mixture has many of the same beneficial properties of mechanically expanded PTFE and numerous properties previously unavailable with expanded PTFE products.

24 Claims, 5 Drawing Sheets

COMPOSITION OF EXPANDED POLYTETRAFLUOROETHYLENE AND SIMILAR POLYMERS AND METHOD FOR PRODUCING SAME

BACKGROUND OF THE INVENTION

1. Field of the Invention

The present invention relates to expanded polytetrafluoroethylene (PTFE) and similar polymer compositions and methods for producing them. More particularly, the present invention relates to improved processes for expanding such compositions at least in part through non-mechanical means and compositions produced through such processes.

2. Description of Related Art

One of the most significant advances in polytetrafluoroethylene (PTFE) processing in recent years was achieved through the expansion of fine powder PTFE polymer resins. As is explained in U.S. Pat. No. 3,953,566 issued Apr. 27, 1976, to Robert W. Gore, by rapidly stretching paste extruded, unsintered PTFE through mechanical means, a material with high strength and high porosity can be produced. Once sintered, the resulting material has proven to be dimensionally stable and to have a wide variety of successful applications, including as electrical insulation with low dielectric constant, waterproof/breathable fabric laminates, sealant material, etc. Various improvements in this basic process are the subject of numerous process and composition patents.

Although presently available expanded PTFE has many exceptional uses, existing mechanical means for stretching PTFE are believed to be deficient in a number of respects. First, stretching through mechanical means has been limited to expanding in only one or two dimensions (i.e. along x and/or y axes), with no fully satisfactory method for providing depth or strength to the product along the z axis. Second, existing forms of expanded PTFE have not had all the properties which are sometimes desired, such as resilience to deformation, sufficient depth and porosity (i.e. low-density) for full thermal insulation, ease in being compression molded, and ease in handling in certain applications (e.g. requiring wrapping of tape to insulate wires). Third, although expanded PTFE has proven quite effective as an electrical insulation, further improvement is believed possible in increasing the conductor's velocity of propagation, lowering the dielectric constant of the insulation, and reducing the insulation's weight.

In an effort to address some of these concerns, a number of attempts have been made to improve electrical insulative properties by expanding certain polymer resins using various chemical blowing techniques. In U.S. Pat. No. 4,304,713 issued Dec. 8, 1981, to Perelman, a volatile chemical blowing agent and a chemical foaming agent are employed with a perfluorocarbon resin to provide a foamed cellular structure with small uniform cell size (i.e. 15–25 mils) for use as an electrical insulation. Using this technique, a coaxial cable insulation is reported with a dielectric constant of 1.38, a void content of 65%, and a velocity of propagation of 85%. In U.S. Pat. No. 4,663,095 issued May 5, 1987 to Battais, a mixture of PTFE, an aromatic pore-forming agent (e.g. benzene), a foaming agent, and a lubricating oil is reported to produce a foamed insulation for coaxial cable with a dielectric constant of 1.3 or less.

Although these processes may work reasonably well, they are considered deficient in a number of respects. For instance, these blowing techniques are believed to be overly difficult to control and too inconsistent in result. Further, foamed materials made using these techniques are believed to continue to have a number of inadequacies, such as difficulty in wrapping insulation and susceptibility to densification.

Similar blowing techniques have also been applied to producing electrically insulative covers from other polymers. For instance, U.S. Pat. No. 5,110,998 issued May 5, 1992, to Muschiatti, reviews a number of previous attempts to achieve electrical insulation with a low dielectric constant. In that patent, an insulative foamed conductor is created using one of a variety of polymers (e.g. polypropylene or polyethylene) and a solvent foaming agent to produce an "ultramicrocellular" wire cover. This wire cover is reported to have a void volume of greater than 75–94% and a velocity of propagation of greater than 90%.

A number of patents have employed microspheres embedded in the polymer to increase the porosity of an electrical insulative coating. Examples of such patents include: U.S. Pat. No. 4,273,806 issued Jun. 16, 1981, to Stechler (employing naturally occurring microspheres of silica and alumina in a polymer such as polyolefin or polyester); U.S. Pat. No. 5,115,103 issued May 19, 1992, to Yamanishi et al. (employing silica or polymer microspheres in an ultraviolet (u.v.) radiation curable polymer such as fluoroacrylate, silicone, or silicone acrylate); and U.S. Pat. No. 5,128,175 issued Jul. 7, 1992, to Yamanishi et al. (employing heat expandable polymer microspheres in a u.v. curable polymer such as silicone acrylate, silicone, or fluorinated acrylate). In the last of these patents, the microspheres are expanded after mixing to produce a "honeycomb" structure with microspheres in contact with each other—achieving a reported porosity of up to 95% and a dielectric constant as low as 1.10. In each of these cases, the resulting density of the product appears to be limited to void volume provided by the incorporated microspheres.

Although the above processes may produce improved electric insulative covers, it is believed that significantly better performance can be achieved. Even though PTFE has been criticized by some as being too inconsistent in form and too difficult to handle, it is recognized as having far superior dielectric performance than other polymers in common usage. Moreover, PTFE has numerous other advantages and uses which might be exploited if a simple and effective means of expanding it in three dimensions were available.

Accordingly, it is a primary purpose of the present invention to produce a PTFE or similar polymer product which is capable of expanding in three dimensions yet retains advantages of mechanically expanded PTFE products, such as increased strength, increased porosity, and low dielectric constant.

It is a further purpose of the present invention to provide such a product which includes sufficient voids and air spaces therein to serve as an improved electrical insulation with a high velocity of propagation and a low dielectric constant and to provide a variety of other properties and advantages previously unavailable in expanded PTFE products.

It is another purpose of the present invention to provide a process for producing such a product which permits the polymer to be formed and expanded on an object in situ, providing an alternative to difficult and labor intensive manufacturing procedures, such as wrapping of expanded PTFE tape.

It is an additional purpose of the present invention to provide a process for producing an expanded PTFE polymer product with improved qualities, such as uniform expanded proportions in three dimensions, sufficient coherent bulk to provide thermal insulation, resilience to deformation and other elastic qualities, and filtration selectivity.

It is yet another purpose of the present invention to provide a process for producing an expanded polymer which permits creation of uniquely shaped articles formed through controlled expansion with or without a mold.

It is a further purpose of the present invention to provide a process and product for efficiently and easily sealing any form of seam, including those formed in textile or medical procedures.

It is still a further purpose of the present invention to develop simplified and improved methods for expanding PTFE and similar polymers.

These and other purposes of the present invention will become evident from review of the following specification.

SUMMARY OF THE INVENTION

The present invention provides improved compositions of expanded polytetrafluoroethylene (PTFE) and similar long-chain polymers and a method for producing such compositions.

The present invention comprises a mixture of polymer, such as PTFE dispersion, and expandable thermoplastic microspheres. By expanding the microspheres in the mixture through exposure to heat or other energy source, it has been determined that a three dimensional scaffold or lattice network is formed of coherent expanded polymeric nodes and fibrils and expanded microspheres. This scaffold has many of the same desirable properties of mechanically expanded PTFE, including improved tensile strength, liquid repellency with moisture vapor permeability, filtration selectivity, and low dielectric constant.

Moreover, the compositions of the present invention have numerous beneficial properties which have eluded previous fine powder PTFE products. For instance, the interaction of the PTFE and the microspheres causes the PTFE to expand in three dimensions—providing length, width and depth to a cohesive expanded product. Among the many important new properties this provides for PTFE products are: unsintered dimensional stability, resilience and resistance to deformation, thermal insulation, buoyancy, padding, moisture retention, moldability, and selective expandability. Further, for use as electrical insulation, wire produced from the composition of the present invention have proven to have extremely low dielectric constants and high velocities of propagation.

In addition, the present invention provides a myriad of improved manufacturing advantages. Among the improved processes of the present invention are: simplified polymer expansion procedures; simplified expanded PTFE application procedures; the ability to create seamless PTFE wire insulation and other products; simplified and improved seam sealing procedures; and the ability to mold and create uniquely shaped articles from fine powder PTFE.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides improved methods for producing expanded polytetrafluoroethylene (PTFE) and similar polymer products and improved compositions of such polymer products for use in a variety of applications.

As is explained in U.S. Pat. No. 3,953,566 to Robert W. Gore, by heating and rapidly mechanically expanding an unsintered fine powder PTFE article in one or two directions through mechanical means, a tetrafluoroethylene polymer material can be created with a micro-structure characterized by nodes interconnected with fibrils. Once sintered to establish expanded dimensional stability, this material is highly porous, has high strength, and has very good electric insulative properties. Among the numerous useful forms of this material is as films/membranes, tubes, rods, and continuous filaments.

In the present invention, PTFE may be expanded by employing expandable microspheres blended into a PTFE composition. Such microspheres comprise a plastic coating surrounding an expandable liquid or gaseous volatile fluid. As is explained in U.S. Pat. No. 3,615,972 issued Oct. 26, 1971, to Morehouse et al., thermoplastic microspheres are adapted to expand dramatically when exposed to heat. These microspheres are monocellular particles comprising a body of resinous material encapsulating a volatile fluid. When heated, the resinous material of thermoplastic microspheres softens and the volatile material expands—causing the entire microsphere to increase substantially in size. On cooling, the resinous material in the shell of the microspheres ceases flowing and tends to retain its enlarged dimension; the volatile fluid inside the microsphere tends to condense, causing a reduced pressure in the microsphere.

Such thermoplastic microspheres are now commercially available from Nobel Industries Sweden, Sundsvall, Sweden, under the trademark EXPANCEL ®. These microspheres may be obtained in a variety of sizes and forms, with expansion temperatures generally ranging from 80° to 130° C. A typical EXPANCEL microsphere has an initial average diameter of 9 to 17 microns and an average expanded diameter of 40 to 60 microns. According to Nobel Industries, the microspheres have an unexpanded true density of 1250–1300 kg/m$^3$ and an expanded density below 20 kg/m$^3$.

Figure 1:
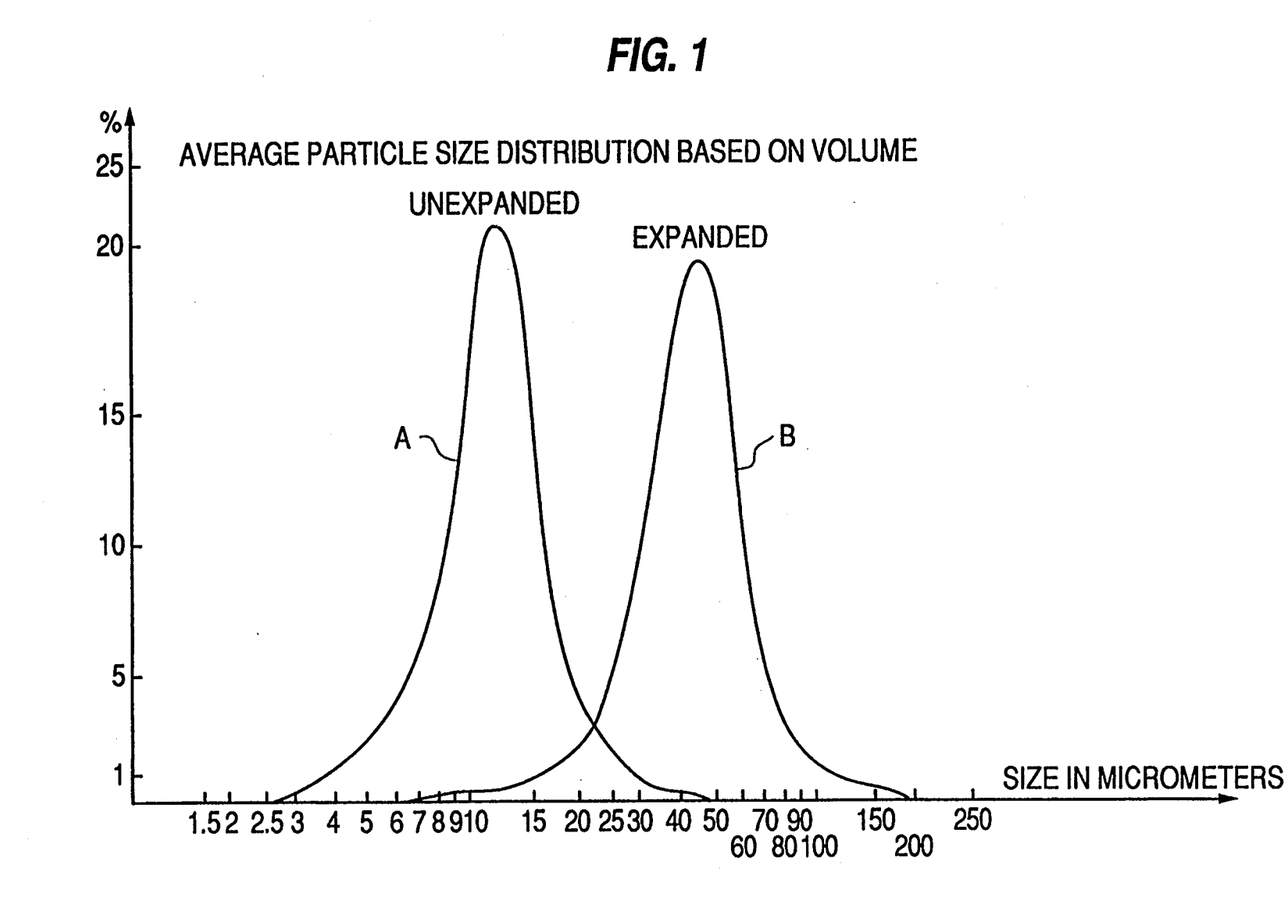
FIG. 1 is a graph showing the typical sizes and ranges of expansion of one form of expandable thermoplastic microspheres employed with the present invention.

The distribution of typical particles sizes of such microspheres can be seen in the graph of FIG. 1. In this illustration provided by Nobel Industries, curves A and B show, respectively, the typical ranges of size of unexpanded microspheres and expanded microspheres.

It should be understood that the use of the term "expandable microsphere" herein is intended to encompass any hollow resilient container filled with volatile fluid which is adapted to expand. Although presently available microspheres are essentially ball-shaped particles adapted to expand when exposed to an energy source, it should be understood that such microspheres are quite resilient in their expanded form and can be compressed and released (e.g. through extrusion) to achieve the expansion required for the present invention. Additionally, it may be possible to form such products in a variety of other shapes, such as tubes, ellipsoids, cubes, particles, etc. As such, the term "expandable microsphere" in the context of the present invention is intended to include all applicable forms and uses of these products now known or later developed.

In one presently preferred embodiment of the present invention, EXPANCEL type 091 DU is employed. This product comprises an off-white dry powder with a particle size between 5 and 50 microns. The shell of the microsphere comprises acrylonitrile or methacrylonitrile. The volatile liquid comprises isopentane.

It has been found that by mixing a dry preparation of EXPANCEL microspheres with a dispersion of PTFE or similar polymer and then heating the resulting composition, the polymer will undergo expansion in three-dimensions to achieve a porous network of polymeric nodes and fibrils. A mixture of PTFE, in the form of paste, dispersion or powder, and microspheres, in the form of dry powder or solution, are mixed in proportions of 1 to 90% by weight microspheres, with 5 to 85% by weight of microspheres being preferred. It should be appreciated that a wide range of products may be created even with a percentage of microspheres of merely 0.1 to 5% by weight; similarly, for some uses, filled products may be created with a percentage of microspheres and/or other fillers between 90 to 99 or more percent by weight. Mixture may occur by any suitable means, including dry blending of powders, wet blending, co-coagulation of aqueous dispersions and slurry filler, high shear mixing, etc.

Once mixed, preferably the resulting composition is heated to a temperature of 80° to 170° C. for a period of 0.5 to 10 minutes to activate the microspheres.

With currently available microsphere technology, if further density reduction is desired, the composition may be re-heated to a temperature of 40° to 200° C. and mechanically expanded through any conventional means, such as those disclosed in U.S. Pat. No. 3,963,566. In fact, it should be appreciated that the present invention is believed to lend itself to incorporation with many existing mechanical expansion techniques, whether before, during and/or after microsphere expansion.

The resulting products have proven to have superior properties. For instance, as is explained in more detail below, when formed around a wire conductor, the composition proved to be an excellent electrical insulation, with typical dielectric constants of 1.04 to 1.25, and typical velocities of propagation of 89–98%. Depending on application, insulations can be created with virtually any dielectric constant in these ranges or greater. From experimentation to date, it has been shown that insulations with dielectric constants of lower than 1.12 and 1.06 can be readily produced using the present invention. As such, in conjunction with the other unique properties of this material, compositions made in accordance with the present invention have tremendous applications in the electrical industries for uses such as high VP cable, sheathing, circuit board insulation, etc.

Moreover, the compositions of the present invention have proven to have a variety of surprising properties previously unattainable with expanded PTFE compositions. The interaction of the PTFE and the microspheres causes the PTFE to expand in three dimensions—providing length, width and depth to the expanded product. Among the vast number of important new or improved properties this provides for PTFE products are: thermal insulation, buoyancy, padding, moisture retention, moldability, extremely low densities, and selective expandability. Furthermore, the present invention provides a wide selection of improved manufacturing techniques.

Two of the more startling improved properties discovered to date of the new expanded PTFE compositions of the present invention are their substantial non-amorphously locked ("unsintered") dimensional stability and their exceptional elasticity/resilience to deformation. Each of these properties was unexpected and each provides many new utilities for expanded PTFE products.

It is quite remarkable that the PTFE products made in accordance with the present invention are dimensionally stable in their unsintered form. As is known, existing expanded PTFE products must be sintered after expansion in order to have the products retain their expanded dimensions. Unexpectedly, the compositions of the present invention form a coherent mass which tends to retain its expanded dimensions with no further treatment. Equally surprising is that this coherent mass can be formed even without pre-treatment of the PTFE polymer (i.e. allowing new applications for expanded PTFE without the need to extrude or otherwise treat the PTFE polymer before expansion).

Another equally remarkable property of the present invention is its ability to "puff" into a resilient cushion-like coherent mass with substantial proportions of open air spaces therein. The mass can expand in all dimensions and, very surprisingly, remains highly self-cohesive despite the dramatic increase in its dimensions and typical air space contents from 10 to 50 to 80% or more. Although not necessary, by mechanically expanding the PTFE/microsphere composition in addition to the microsphere expansion, the resulting product becomes even less dense.

The "puffed" mass of the present invention has proven to be remarkably elastic and resilient to deformation. For instance, a typical expanded mass will withstand compression of 50% or more with nearly 100% rebound to original shape.

Figure 2:
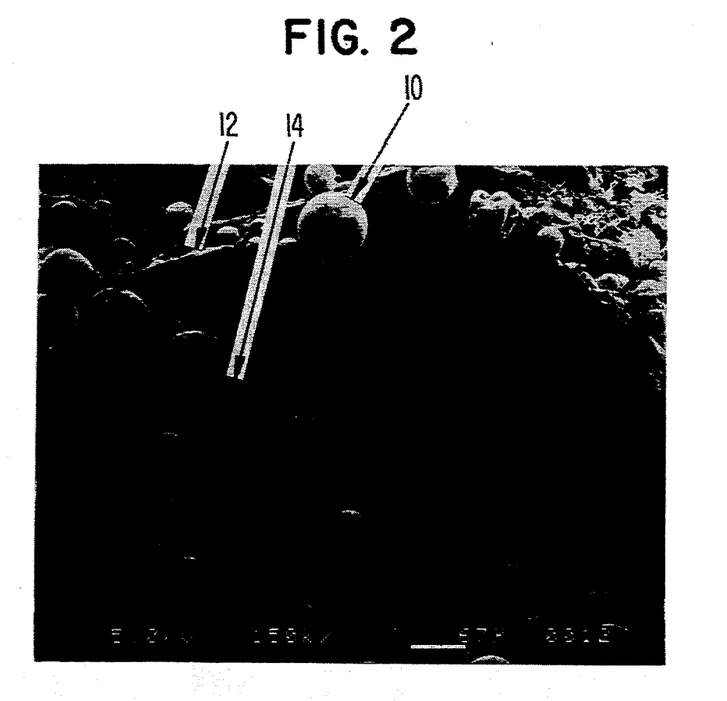
FIG. 2 is a scanning electron microscopic (SEM) image of a composition of the present invention, enlarged 150×.
Figure 3:
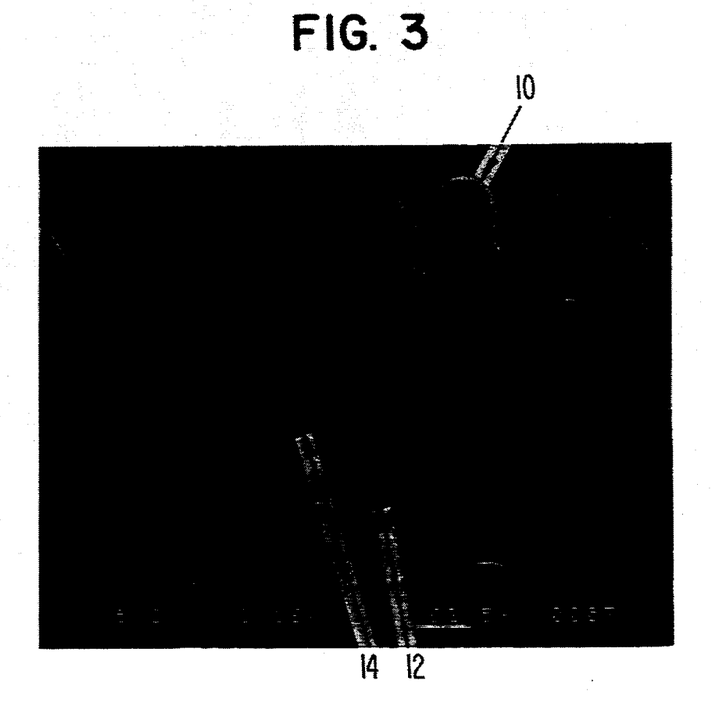
FIG. 3 is an SEM image of a composition of the present invention, enlarged 150×.

Some of these unique properties may be better understood by examination of scanning electron microscopic (SEM) images of expanded compositions made in accordance with the present invention. FIGS. 2 and 3 show SEM images of compositions of the present invention enlarged 150 times. As can be seen, the composition comprises many expanded microspheres 10 interconnected by polymeric fibrils 12 (i.e. thread-like elements) and nodes 14 (i.e. particles from which fibrils emerge). This "scaffold" or "lattice" structure of fibrils and nodes incorporating microspheres defines substantial areas of open air spaces within the composition. It is believed to be both the voids within the microspheres 10 and these air spaces which create many of the unique properties of the present invention.

Figure 4:
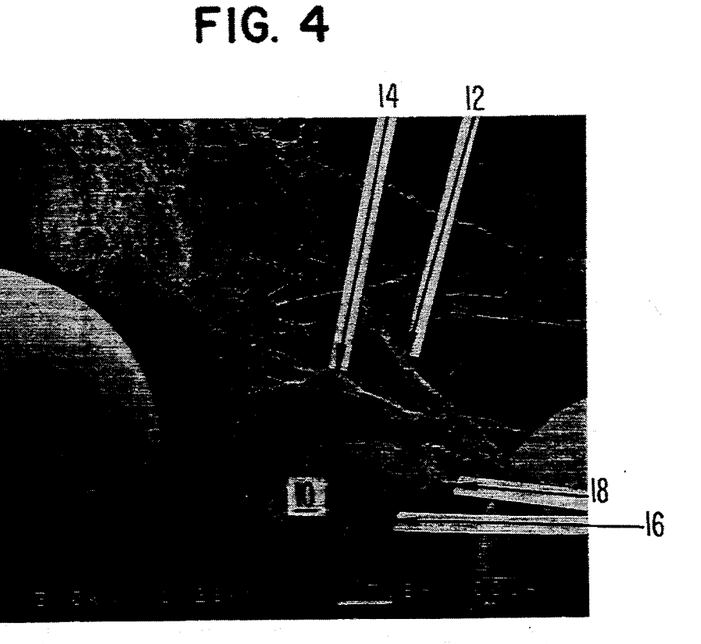
FIG. 4 is an SEM image of a composition of the present invention, enlarged 1280×.

The particular relationship between the microspheres and the polymer can be better seen in the SEM image of FIG. 4. In this image, magnified 1280 times, the microspheres 10 can be seen attached to and embedded within fibrils 12 and nodes 14. As is shown, the polymer actually becomes attached to the microspheres, apparently with some fibrils 16 extending directly from the microspheres 10 and some nodes 18 attached directly to the surface of the microspheres 10.

Figure 5:
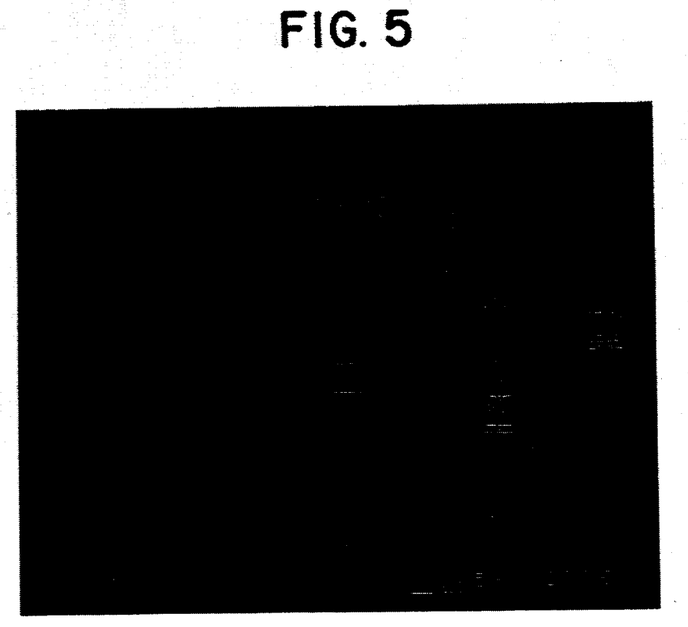
FIG. 5 is a cross-sectional SEM image of a conductive substrate (wire) coated with the composition of the present invention and contained within a sheath, enlarged 30×.

One important application for the composition of the present invention is in creating molded articles. Unlike previous compositions made with fine powder PTFE, the present invention will readily expand to fill molds or other forms. Shown in FIG. 5 is a cross-sectional view of a conductor 20 housed within a sheath material 22, such as PTFE or acrylic. By partially filling the sheath 22 (or, as is explained below, by coating the conductor 20) with the polymer/microsphere composition 24 of the present invention, the composition can be expanded to fill in the sheath thoroughly and provide an even coating around the conductor 20. An alternative coating may be created by heating the conductor itself to institute composition expansion.

This unique property of the present invention can be readily applied to create coherent expanded PTFE products in virtually any imaginable shape, including inducing expansion to occur in only predetermined directions. At least three different mechanisms may be employed in this regard—selective heating, external constriction, and/or internal constriction.

First, compositions made in accordance with the present invention may be selectively heated to activate expansion in only certain directions or in certain areas. In this regard, heat may be focused through any known means to activate the microspheres only in the desired locations (e.g. use of focused heat through conduction or convection, directed electrical current, or a laser).

Second, by applying external constriction in the form of a mold, expansion of the composition can be directed into only certain directions. This promises to be a very productive means of creating a large array of molded products. Additionally, this process also accommodates use of the composition of the present invention to fill gaps between component parts often found in a variety of manufacture and repair operations.

Third, as is known, certain polymers can be treated to produce internal orientation of their structure so that they are resistant to expansion in certain directions. For example, by mechanically expanding PTFE in the manner previously referenced, increased tensile strength can be established in certain directions within the expanded PTFE lattice (e.g. in the x and/or y axis). Through conventional means of mechanical expansion (e.g. stretching, calendering, extruding, etc.) of the PTFE polymer in predetermined directions prior to activation of the microspheres, this should provide internal limitation of the growth of the polymer/microsphere compositions and cause growth in the unrestrained direction during activation of the microspheres.

It should be evident that one or more of these molding methods may be applied in concert to provide unique application-specific properties. Moreover, by selectively constricting the products, many different characteristics can be imparted, such as continuous PTFE products with variable densities or shapes, ribbed PTFE products, etc.

Another important application for the present invention is as a thread material. One common problem in virtually all instances where a sewn seam is created (e.g. in fabric or medical (i.e. suture) uses) is that the needle creates an opening larger than the thread. In those instances where leakage is a concern (e.g. in waterproof fabrics or in a medical procedure), the seam must then be sealed or wrapped through one or more various time-consuming procedures. By forming threads using the present invention, the need for seam-sealing may be significantly reduced or eliminated.

At least two possible options are available for seam-sealing using the composition of the present invention. First, by forming a thread from a composition of polymer and unexpanded microspheres (e.g. through extrusion), seams can be created and sewn using conventional methods. Once the thread is in place, the seams can then be treated to cause the polymer/microspheres to expand, swelling the thread and sealing the openings caused by the needle. Second, due to the resilient nature of the composition of the present invention, by merely forming the thread out of an expanded polymer/microsphere composition, it may be possible to reduce leakage through the holes significantly through no more than the thread's natural tendency to resist deformation and rebound to the diameter it was before being sewn in place. Various preferred options for thread construction are shown in FIGS. 6A, 6B, 7A and 7B.

Figure 6A:
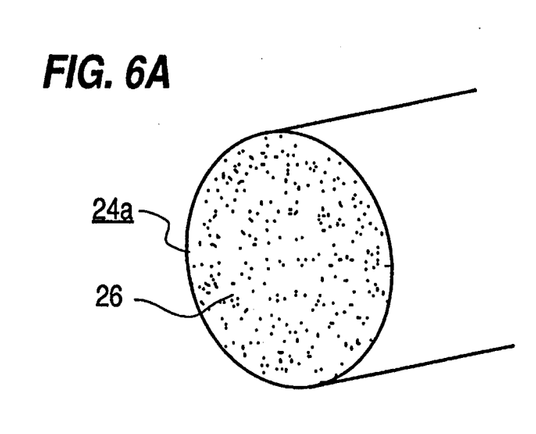
FIG. 6A is a cross-sectional view of one embodiment of a thread formed in accordance with the present invention.
Figure 6B:
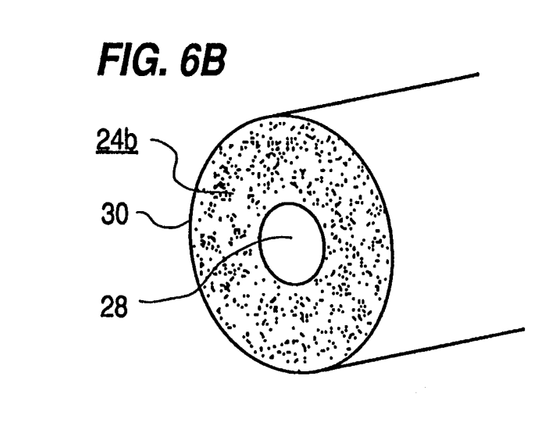
FIG. 6B is a cross-sectional view of another embodiment of a thread formed in accordance with the present invention.

FIGS. 6A and 6B illustrate two options for a thread 24a, 24b which is "puffed" once sewn in place. In FIG. 6A, the thread 24a comprises a composition 26 of polymer/unexpanded microspheres and a conductive filler, such as carbon black. In FIG. 6B, the thread 24b comprises a conductive core 28 (e.g. a wire or conductive fiber) surrounded by a composition 30 of polymer/unexpanded microspheres. In both instances, once the thread is in place, microsphere activation energy (e.g. heat through conduction, convention, or electrical resistance) is transmitted through the thread (either through the conductive filler or through the conductive core 28), causing the thread to expand in place.

The advantage of providing an expandable thread 24a, 24b with some form of conductive element in the thread itself is that the thread can be expanded with minimal impact on the material or tissue surrounding the thread. Of course, the thread may also be constructed from a polymer/microsphere composition with no core or fillers; in this event, the thread is expanded merely through the application of activation energy directly to the outside of the thread (e.g. by generally heating the seam or subjecting the seam to a localized energy source, like a laser).

Figure 7A:
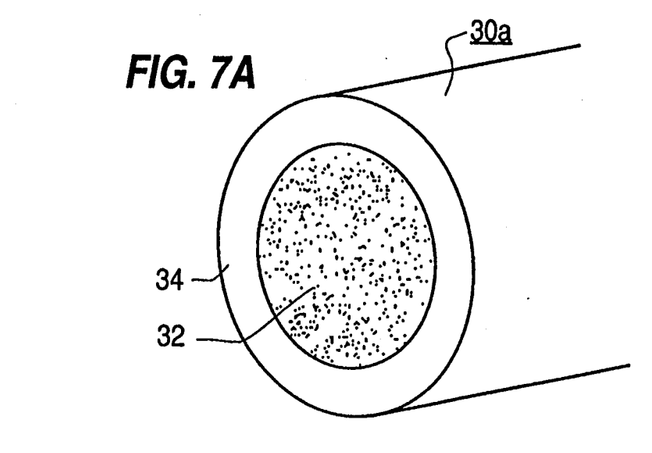
FIG. 7A is a cross-sectional view of yet another embodiment of a thread formed in accordance with the present invention.
Figure 7B:
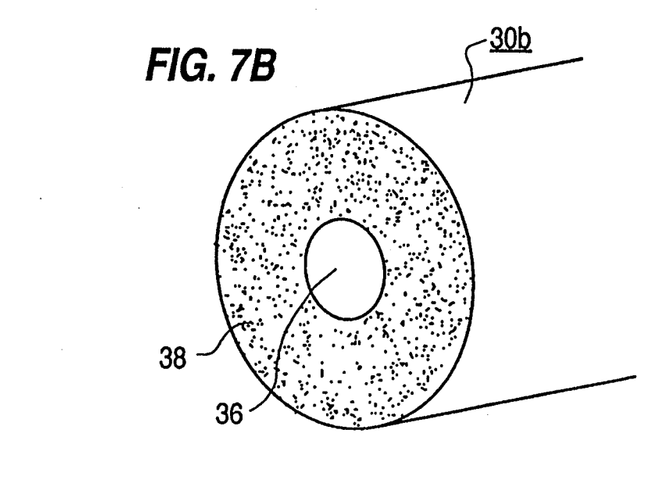
FIG. 7B is a cross-sectional view of still another embodiment of a thread formed in accordance with the present invention.

FIGS. 7A and 7B illustrate two examples of threads 30a, 30b which are "pre-puffed" before being sewn in place. The thread 30a of FIG. 7A comprises a core 32 of pre-expanded polymer/microspheres housed within a sheath 34. Ideally, the sheath 34 should provide sufficient resilience to allow deformation and rebound of the polymer/microsphere core and a smooth surface for ease in sewing. Suitable material includes PTFE, acrylic, etc. FIG. 6B shows an example of a thread 30b with the reverse construction having a strong core 36 (e.g. KEVLAR, PTFE, etc.) and a sheath 38 of pre-expanded polymer/microsphere composition.

Figure 8:
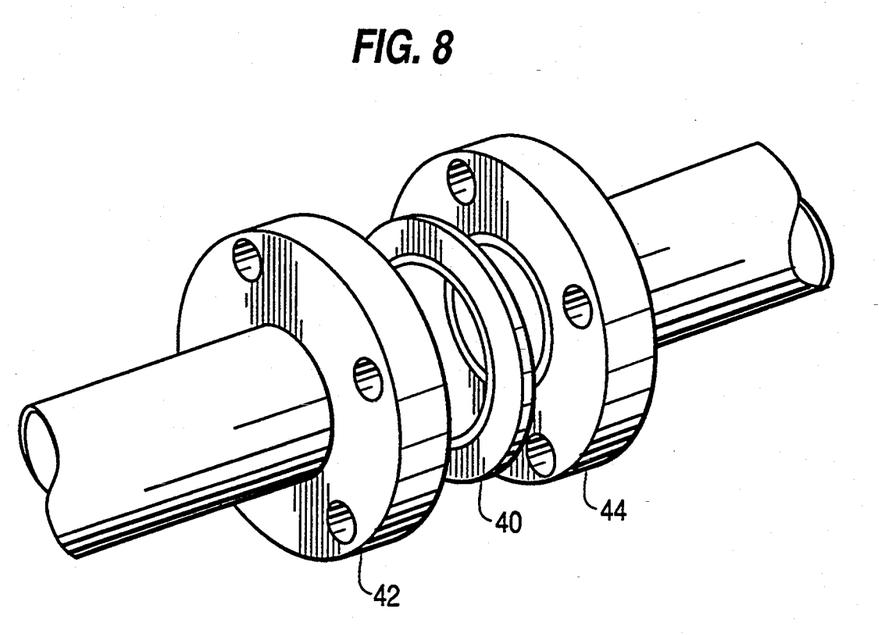
FIG. 8 is a three-quarter isometric view of a gasket made in accordance with the present invention.

Another important application of the present invention is as a sealing and gasketing material. As is shown in FIG. 8, a gasket 40 can be readily formed from a polymer/microsphere composition of the present invention and employed in any conventional manner. Depending upon application, it may be possible to create a superior seal with such a product by activating the microspheres after the gasket 40 is in place, such as between fittings 42, 44. To control expansion in this context, the polymer/microsphere composite can be wrapped in a film (e.g. a plastic tube or a tape of PTFE).

Another surprising property of the present invention is that the composition will attach itself to a variety of substrates with limited "flaking off" after expansion. For instance, by merely dipping a wire or other conductor in a prepared composition of PTFE and microspheres and expanding the microspheres, an effective insulative layer can be formed around the conductor. This process is a vastly more expedient method of providing a PTFE insulation on a conductor than any present available.

This same procedure can be applied to produce numerous other expanded PTFE products. In textiles, a dip or coating process can be applied over a thin substrate (e.g. a film of latex or expanded PTFE) to produce seamless PTFE gloves, socks, footwear, drysuits/wetsuits, etc. This process not only eliminates the labor intensive task of forming and sealing seams, but also may allow for greater dexterity and improved performance. In a like manner, certain products, such as gloves or boots, can be created by expanding the PTFE/microsphere composition while being worn by a user to create a customized fit.

By coating a substrate and placing it in a mold for microsphere expansion, a wide number of unique molded items can be created, including ones with variable polymer densities. For instance, by placing the polymer/microsphere composition in a mold having selective constricted areas, once the coherent polymer/microsphere mass is expanded, it will comprise greater and lesser thicknesses, with generally greater polymer density in those areas of lesser thickness.

Another useful application for the present invention is in its use as a filter element. Not only can the composition of the present invention be formed to provide selective chemical permeability, but it also has other attributes not previously attainable with PTFE filter material. For example, it has been determined that, once saturated under forced liquid pressure, an expanded PTFE/microsphere material of the present invention has the ability to retain moisture for long periods of time. As such, filter elements now requiring pre-wetting or other pre-installation treatment can be supplied in a ready-to-use form, significantly reducing labor and costs associated with filter replacement procedures.

In addition to success in creating a variety of expanded products using a PTFE polymer, it has been determined that certain other polymers will also expand in the presence of expandable microspheres in the manner described to create a lattice of polymeric nodes and fibrils and air spaces. As is explained in the following examples, expansion to form polymeric nodes and fibrils and air spaces has been achieved by using similar processes in conjunction with ultra-high molecular weight polyethylene polymer. Applicants believe that comparable results may also be achieved by employing the present invention with other long-chain polymers, particularly those with a high modulus of crystalinity, e.g.: polypropylene, polyvinyl alcohol (PVA), poly(ethylene terephthalate) (PET), polyvinyl idene fluoride (PVDF), etc.

Without intending to restrict the scope of the present invention, the following represent examples of how the present invention may be employed.

EXAMPLE 1

A 5% EXPANCEL/95% PTFE by weight sample was made by the following method: A slurry of 7.8 g of EXPANCEL - 091 DU obtained from Nobel Industries, 1519 Johnson Ferry Road, Marietta, Ga. 30062, and 551.2 g of de-ionized water was prepared in a 2 liter baffled stainless steel container. While the slurry was agitating at 800 RPM, 148.2 g of PTFE in the form of a 20.0% dispersion was rapidly poured into the vessel. The PTFE dispersion was an aqueous dispersion obtained from ICI Americas, Inc. After 30 seconds, 2.2 g of a 0.4% solution of a cationic modified polyacrylimide was added to initiate the co-coagulation. After a total of 1 minute 20 seconds, the mixer was stopped. The coagulum settled to the bottom of the vessel and the effluent was clear.

The coagulum was dried at 110° C. in a convection oven. The dried cake was chilled below 0° C. It was hand ground through a 0.635 cm mesh stainless steel screen. A 35 g sample of screened powder was lubricated with mineral spirits at a ratio of 0.375 cc solvent per gram of powder. The mixture was chilled, passed through a 0.635 cm mesh screen again, tumbled, then allowed to sit at 18° C. for 16 hours and was re-tumbled.

A 2.54 cm diameter pellet was formed in a cylinder at 200 psi. The pellet was then extruded through a 0.254 cm diameter die at a ram rate of 50.8 cm/min.

The extruded beading was then dried at 105° C. in a convection oven for 1 hour. A 19.04 cm long piece of the dried extrudate measuring 0.297 cm in diameter, weighing 1.924 gms, and a calculated density of 1.457 g/cc was then placed in a convection oven at 165° C. for 3 minutes to "puff" the microspheres (i.e. heat activating and subsequent growing of the spheres). Upon removal from the oven the sample was measured to be 28.1 cm long, having a diameter of 0.569 cm, a weight of 1.918 g, and a calculated density of 0.268 g/cc.

EXAMPLE 1a

A 15.0 cm long section was cut from the sample produced in Example 1. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 49.0 cm long, 0.399 cm in diameter, weight of 0.343 g., with a calculated density of 0.056 g/cc.

EXAMPLE 2

A 15% EXPANCEL/85% PTFE by weight sample was made by using the same method as Example 1 except the following component amounts were used:

Slurry of 23.4 g of EXPANCEL - 091 DU and 613.6 g of de-ionized water 132.6 g of PTFE in the form of a 20.0% dispersion 2.1 g of a 0.4% solution of a cationic modified polyacrylimide 35 g sample of screened powder was lubricated with mineral spirits at a ratio of 0.375 cc solvent per gram of powder.

A 19.04 cm long piece of the dried extrudate measuring 0.297 cm in diameter, weighing 1.827 g and a calculated density of 1.383 g/cc was then placed in a convection oven at 165° C. for 3 minutes. Upon removal from the oven the sample was measured to be 37.3 cm long, having a diameter of 0.828 cm, a weight of 1.807 g, and a calculated density of 0.090 g/cc.

EXAMPLE 2a

A 15.0 cm long section was cut from the sample produced in Example 2. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 21.5 cm long, 0683 cm in diameter, weight of 0.239 g, and a calculated density of 0.030 g/cc.

EXAMPLE 2b

Using the same procedure and sample size as Example 2a the following sample was produced. The sample measured to be 42.0 cm long, 0.612 cm in diameter, weight of 0.240 g, and a calculated density of 0.019 g/cc.

EXAMPLE 2c

A 15.0 cm long section of dried extrudate was cut from Example 2 measuring 0.297 in diameter. A 5.0 cm long section was marked off in the center of this piece using an indelible marker. The sample was placed in a convection oven at 115° C. for 7 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 64.1 cm long, 0.287 cm in diameter, weight of 0.474 g, with a calculated density of 0.114 g/cc. This sample was then placed unrestrained in a convection oven at 165° C. for 3 minutes. Upon removal from the oven, the sample had a length of 30 cm, a diameter of 0.533 cm, a weight of 0.471 g and a calculated density of 0.070 g/cc.

EXAMPLE 3

A 25% EXPANCEL/75% PTFE by weight was made by using the same method as Example 1 except the following component amounts were used:

Slurry of 39.0 g of EXPANCEL - 091 DU and 676.1 g of de-ionized water 117.0 g of PTFE in the form of a 20.0% dispersion 2.0 g of a 0.4% solution of a cationic modified polyacrylimide 35 g sample of screened powder was lubricated with mineral spirits at a ratio of 0.375 cc solvent per gram of powder.

A 19.04 cm long piece of dried extrudate measuring 0.297 cm in diameter weighing 1.690 g and a calculated density of 1.280 g/cc was then placed in a convection oven at 165° C. for 3 minutes. Upon removal from the oven the sample was measured to be 40.2 cm long, having a diameter of 0.955 cm, and a weight of 1.666 g, and a calculated density of 0.058 g/cc.

EXAMPLE 3a

A 15.0 cm long section was cut from the 0.955 cm diameter sample produced in Example 3. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 27.0 cm long, 0.648 cm in diameter, weight of 0.203 g, and a calculated density of 0.023 g/cc.

EXAMPLE 3b

A sample of the dried extrudate measuring 0.297 cm in diameter from Example 3 was then tested for breakstrength on a Instron Model 1130. Gauge length (distance between clamps) was two inches. Samples were pulled apart at 10 inches/min with maximum tensile force being recorded. The sample was measured to have a breakstrength of 0.77 lbs.

A sample of the 0.955 cm diameter from Example 3 was then tested for breakstrength on a Instron Model 1130. Gauge length (distance between clamps) was two inches. Samples were pulled apart at 10 inches/min with maximum tensile force being recorded. The sample was measured to have a breakstrength of 1.78 lbs.

EXAMPLE 4

A 50% EXPANCEL/50% PTFE by weight sample was made by the following method:

A slurry of 78 g of EXPANCEL - 091 DU and 867 g of de-ionized water was prepared in a 2 liter baffled stainless steel container. While the slurry was agitating at 800 RPM, 78 g of PTFE in the form of a 20.0% dispersion was rapidly poured into the vessel. The PTFE dispersion was an aqueous dispersion obtained from ICI Americas, Inc. After 30 seconds, 3.0 g of a 0.4% solution of a cationic modified polyacrylimide was added to initiate the co-coagulation. After a total of 1 minute, the mixer was stopped. The coagulum settled to the bottom of the vessel and the effluent was slightly cloudy.

The coagulum was dried at 110° C. in a convection oven. The dried cake was chilled below 0° C. It was hand ground through a 0.635 cm mesh stainless steel screen. A 35 g sample of screened powder was lubricated with mineral spirits at a ratio of 0.309 cc solvent per gram of powder. The mixture was chilled, passed through a 0.635 cm mesh screen again, tumbled, then allowed to sit at 18° C. for 16 hours and was re-tumbled.

A 2.54 cm diameter pellet was formed in a cylinder at 200 psi. The pellet was then extruded through a 0.254 cm diameter die at a ram rate of 50.8 cm/min.

A 30.0 length of the extrudate was then placed in a convection oven at 165° C. for 6 minutes. Upon removal from the oven the sample was measured to be 58.0 cm long, having a diameter of 1.524 cm, a weight of 2.352 g, and a calculated density of 0.022 g/cc.

EXAMPLE 4a

A 15.0 cm long section was cut from the 1.524 cm diameter sample produced in Example 4. A 5.0 cm long section was marked off in the center of this piece using an indelible marker. The sample was placed in a convection oven at 165° C. for 3 minutes. The sample was then grabbed by hand outside of the marks. The sample was stretched inside the oven by separating hands. The time of stretch was estimated to be approximately 5.0 seconds. The sample was then cut at the marks and measurements were taken on the center section. The sample measured to be 13.1 cm long, 1.283 cm in diameter, weight of 0.200 g, and a calculated density of 0.012 g/cc.

EXAMPLE 5

A 75% EXPANCEL/25% PTFE by weight was made by using the same method as Example 4 except the following component amounts were used:
Slurry of 117 g of EXPANCEL - 091 DU and 950 g of de-ionized water
39 g of PTFE in the form of a 20.0% dispersion
4.0 g of a 0.4% solution of a cationic modified polyacrylimide
25 gram sample of screened powder was lubricated with mineral spirits at a ratio of 0.309 cc solvent per gram of powder.

A 30.0 cm length of the sample was then placed in a convection oven at 165° C. for 6 minutes. Upon removal from the oven the sample was measured to be 51.0 cm long, having a diameter of 1.702 cm, weight of 1.834 g, and a calculated density of 0.016 g/cc.

EXAMPLE 6

A slurry of 2610 g of EXPANCEL - 091 DU and 45.2 Kg of de-ionized water was prepared in a 30 gallon stainless steel container. While the slurry was agitating, 7.83 Kg of PTFE in the form of a 20.0% dispersion was rapidly poured into the vessel. The PTFE dispersion was an aqueous dispersion obtained from ICI Americas, Inc. After 20 seconds, 147 g of a 0.4% solution of a cationic modified polyacrylimide was added to initiate the co-coagulation. After a total of 1 minute 44 seconds, the mixer was stopped. The coagulum settled to the bottom of the vessel and the effluent was clear.

The coagulum was dried at about 110° C. in a convection oven. The dried cake was chilled below 0° C. It was hand ground through a 0.635 cm mesh stainless steel screen. A sample of screened powder was lubricated with mineral spirits at a ratio of 0.265 cc solvent per gram of powder. The mixture was chilled, passed through a 0.635 cm mesh screen again, tumbled, then allowed to sit at 18° C. for 16 hours and was re-tumbled.

The powder was then extruded through a 10.1 cm diameter barrel and a 0.203 × 15.2 cm die at a ram rate of 100 cm/min.

The extruded tape was then allowed to air dry in ambient conditions overnight.

EXAMPLE 6a

A piece of the dried extrudate made in accordance with Example 6 was then placed in a convection oven at 165° C. for 5 minutes. Upon removal from the oven the sample was measured to be 33.3 cm long, 19.4 cm wide, 1.4 cm thick, a weight of 69.72 g, and a calculated density of 0.077 g/cc.

EXAMPLE 6b

Another sample was produced in the same manner as Example 6. A 10 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 34.7 cm long, 14.3 cm wide, 1.21 cm thick, a weight of 19.64 g, and a calculated density of 0.033 g/cc.

EXAMPLE 6c

Another sample was produced in the same manner as Example 6. This material was measured to have a thickness of 0.208 cm and a width of 14.8 cm. The material was then additionally processed by calendering between two metal rolls using the following gap sizes and output speeds in nine successive steps:

| Steps | 1 | 2 | 3 | 4 | 5 | 6 | 7 | 8 | 9 |
|---|---|---|---|---|---|---|---|---|---|
| GAP (cm) | 0.155 | 0.091 | 0.051 | 0.025 | 0.010 | 0.003 | 0.003 | <.003 | <.003 |
| SPEED (m/min) | 5.5 | 6.1 | 7.0 | 6.7 | 5.2 | 6.4 | 6.1 | 6.1 | 6.1 |

The calendered material had a thickness of 0.0077 cm and a width of 13.2 cm. The material was then placed in a convection oven at 165° C. for 5 minutes. A length of material was cut from the sample and measured to be 44.5 cm long, 39.4 cm wide, 0.036 cm thick, a weight of 5.30 g, and a calculated density of 0.084 g/cc.

EXAMPLE 7

The following example describes the method in which to determine AIR SPACE VOLUME of a sample. AIR SPACE VOLUME should be interpreted as the volume of air contained within the sample which is not inside the microspheres. AIR SPACE VOLUME is calculated using the equations below and is based on the following definitions and assumptions:

PTFE VOLUME is the calculated volume of PTFE within sample.

MICROSPHERE VOLUME is the calculated volume of the microsphere shell, including contents, within sample.

BULK VOLUME is the dimensionally measured volume of the sample.

AIR SPACE VOLUME=[BULK VOLUME]−[MICROSPHERE VOLUME+PTFE VOLUME].

SAMPLE DENSITY=sample weight/BULK VOLUME.

Puffed microspheres for this example were assumed to have an average density of 0.03 g/cc.

The density of PTFE was assumed to be 2.20 g/cc.

The % weights of PTFE and microspheres were assumed constant through processing.

The % volume of each component of the sample was calculated using the following equations:

PTFE VOLUME=[% weight PTFE×SAMPLE DENSITY/density PTFE]

MICROSPHERE VOLUME=[% weight microsphere×SAMPLE DENSITY/density microsphere]

AIR SPACE VOLUME=100%−[% PTFE VOLUME+% MICROSPHERE VOLUME]

The above method was used to calculate the AIR SPACE VOLUME of several samples which were produced in previous examples. The results shown in following table:

| EXAMPLE No. | SAMPLE DENSITY | % PTFE VOLUME | % MICROSPHERE VOLUME | % AIR-SPACE VOLUME |
|---|---|---|---|---|
| 1 | 0.268 gm/cc | 11.5% | 44.8% | 43.7% |
| 2b | 0.019 gm/cc | 0.8% | 9.7% | 89.5% |
| 3 | 0.058 gm/cc | 2.0% | 48.3% | 49.7% |
| 4 | 0.022 gm/cc | 0.5% | 36.7% | 62.8% |
| 4a | 0.012 gm/cc | 0.3% | 20.0% | 79.7% |
| 5 | 0.016 gm/cc | 0.2% | 40.0% | 59.8% |
| 6b | 0.033 gm/cc | 1.1% | 27.5% | 71.4% |

EXAMPLE 8

A water resistance test on samples of Examples 6a, 6b and 6c was conducted. Two 8 inch square waterproof bags were prepared by cutting an approximate 3.0 inch square window into one side of each of the bags. A 5 inch square sample cut from each of the Examples 6a–6c was placed inside the bags. The window perimeters were sealed to the samples using duct tape thereby exposing only a 2.5 inch square portion of the sample to the outside. An absorbent paper towel was place behind each of the samples, opposite of the cut window, then the bags were sealed.

The bags were placed flat on the floor inside a simulated rain room with the windows facing upward towards the rain. The rain impinged upon the samples for 30 minutes at a rate of 3 inches of water per hour.

The samples were examined immediately after the rain test for water penetration by visually checking for wetness of the paper towels. In all the examples, the paper towels were completely dry.

EXAMPLE 9

A moisture vapor transmission rate test (MVTR) on samples of Examples 6a, 6b, and 6c was conducted. This test apparatus consists of a reservoir filled with distilled water maintained at 23° C. The reservoir is covered by a porous expanded polytetrafluoroethylene (ePTFE) membrane having a high moisture vapor transmission rate (MVTR). Cups having a mouth diameter of 3.5 inches are prepared by partially filling the cup with potassium acetate and then covering the mouth of the cup with the same high MVTR ePTFE membrane.

Samples to be tested are then placed on the membrane covering the reservoir and weighed cups of the potassium acetate are placed membrane side down onto the samples. A weighed control cup of potassium acetate is placed membrane side down directly onto the reservoir membrane. After 30 minutes, the cups of potassium acetate are weighed. The weight gain is calculated and then MVTR expressed in [(gm/meter$^2$)/24 hours] is calculated using the following formula:

MVTR=[weight gain (gm)]×[433960/Test time (min)]

Samples from the above Examples 6a, 6b and 6c were tested in the above described manner. The samples were of sufficient size to enable 3 cups to be placed on Example 6a, 5 cups on Example 6b, and 5 cups on Example 6c. The results of this test are summarized in the following tables:

| SAMPLE ID | CUP # | WT. GAIN | MVTR |
|---|---|---|---|
| CONTROL | 1 | 0.840 GMS | 12237 |
| EXAMPLE 6a | 2 | 0.084 GMS | 1219 |
| EXAMPLE 6a | 3 | 0.070 GMS | 1013 |
| EXAMPLE 6b | 4 | 0.085 GMS | 1230 |
| EXAMPLE 6b | 5 | 0.141 GMS | 2040 |
| EXAMPLE 6b | 6 | 0.124 GMS | 1794 |
| EXAMPLE 6b | 7 | 0.132 GMS | 1909 |
| EXAMPLE 6b | 8 | 0.143 GMS | 2068 |
| EXAMPLE 6b | 9 | 0.191 GMS | 2763 |
| CONTROL | 1 | 0.799 GMS | 11558 |
| EXAMPLE 6c | 2 | 0.741 GMS | 10719 |
| EXAMPLE 6c | 3 | 0.795 GMS | 11500 |
| EXAMPLE 6c | 4 | 0.707 GMS | 10227 |
| EXAMPLE 6c | 5 | 0.713 GMS | 10314 |
| EXAMPLE 6c | 6 | 0.730 GMS | 10559 |

Surprisingly, these rates of moisture vapor transmission are comparable to many much thinner "breathable" fabric laminates now on the market.

EXAMPLE 10

A thermal conductivity test was conducted on the above sample 6a. A sample measuring 12 inches was tested according to ASTM C518 procedures using the Holometrics Rapid K Thermal Conductivity Instrument Model RK 80. A constant 20° C. water bath was supplied by Neslab.

The equation used to calculate thermal conductivity of an unknown ($\lambda$) measured in BTU-INCH/(HR-FT$^2$-°F.) is as follows:

$$\lambda = \lambda_c[(Q)(\Delta X)(\Delta T)_c] \div [(Q)_c(\Delta X)_c(\Delta T)]$$

where:

$\lambda_c$=thermal conductivity of calibration sample.

Q=total heat flow $\Delta X$=thickness of sample in inches

ΔT = temp of hot face - temp of cold face
( )$_c$ = calibration sample

ΔT for testing was 30° C. with the upper face at 60° C. and the lower face at 30° C. Thermal conductivity (λ) for sample 6a was calculated to be 0.268 BTU-INCH/(HR-FT$^2$-F).

EXAMPLE 11

A slurry was mixed consisting of 15.14 g of PTFE in the form of a 60.0% dispersion and 14.91 g of EXPANCEL - 091 DU and 5.14 g of distilled water. This yields a solids content of 50% PTFE to 50% EXPANCEL. The PTFE dispersion used was part number TE 30, an aqueous dispersion obtained from E. I. Dupont.

A plain weave 50 denier ePTFE fabric of approximately 112×112 picks per inch was dipped in the above slurry and the excess slurry wiped off. The fabric was allowed to air dry for approximately 1 hour in ambient conditions. The fabric was then placed between two heated platens at 165° C. with a fixed gap of approximately 2 mm for 1 minute. The platens were then opened and the sample was removed. The sample was found to be a flexible, stable, membrane-like material with good adhesion of the coating to the fabric.

A water penetration test was conducted on this fabric by cupping the fabric within a 3 inch diameter beaker and pouring 10 ml of water into the cupped portion of the fabric. After one minute there was no visible leakage of the water through the fabric.

EXAMPLE 12

A slurry was mixed consisting of 15.14 g of PTFE in the form of a 60.0% dispersion and 14.91 g of EXPANCEL - 091 DU and 10.19 g of distilled water. This yields a solids content of 50% PTFE to 50% EXPANCEL. The PTFE dispersion used was part number TE 30, an aqueous dispersion obtained from E. I. Dupont.

A 100% acrylic fabric style 4803 manufactured by Glen Raven Mills Inc., Glen Raven, N.C. 27217, was dipped in the above slurry and the excess slurry wiped off. The fabric was allowed air dry for approximately 1 hour in ambient conditions. The fabric was then placed between two heated platens at 165° C. with a fixed gap of approximately 2 mm for 1 minute. The platens were then opened and the sample was removed. The sample was found to be a flexible, stable, membrane-like material with good adhesion of the coating to the fabric.

EXAMPLE 13

A slurry was mixed consisting of 15.14 g of PTFE in the form of a 60.0% dispersion and 14.91 g of EXPANCEL - 091 DU and 10.19 g of distilled water. This yields a solids content of 50% PTFE to 50% EXPANCEL. The PTFE dispersion used was part number TE 30, an aqueous dispersion obtained from E. I. Dupont.

The slurry was then painted onto a ⅜ inch diameter copper tube using a conventional paint brush and allow to air dry at ambient conditions for 1 hour. The tube was then placed in a convection oven at 165° C. for 3 minutes to expand the EXPANCEL micro-balloons. The tube was then removed and inspected. Good adhesion properties between the coating and the tube were observed.

EXAMPLE 14

A slurry was mixed consisting of 20.94 g of PTFE in the form of a 60.0% dispersion and 27.88 g of EXPANCEL - 091 DU and 3.5 g of distilled water. This yields a solids content of 43% PTFE to 57% EXPANCEL. The PTFE dispersion used was part number TE 30, an aqueous dispersion obtained from E. I. Dupont.

A 24 gauge silver plated copper wire was "dipped" coated with the above slurry by inserting the wire through a small hole in the bottom of the mix container and drawing the wire upwards through the bath. The wire was then hung vertically to dry for approximately 30 minutes at ambient conditions.

The 3.5 ft section of dried coated wire was inserted inside an expanded PTFE tube (e.g. tubing produced according to Gore U.S. Pat. No. 3,953,566) of the same length having an inside diameter (I.D.) of 2 mm, an outside diameter (O.D.) of 3 mm, and a porosity of 70%. The assembly was then placed in a convection oven for 3 minutes at 165° C. in order to puff the wire coating so that it fills the annular space between the wire and the PTFE tubing. The sample was removed and allowed to cool. The density of the puffed coating was calculated to be 0.096 g/cc using the known weight and volume of the puffed coating.

The wire assembly was then helically wrapped with aluminized polyester film and tested for velocity of propagation (V.P.). A Techtronics Model CSA 803 was used in TDR mode (time domain reflectometry) to measure velocity of propagation. A cable length of 5.47 ft was measured to have a signal delay of 1.055 ns/ft, which converts to a signal speed of $2.889 \times 10^8$ meters/sec. This signal speed divided by the speed of light in a vacuum ($2.998 \times 10^8$ m/s) yields a V.P. of 96.36%. From this value, the dielectric constant (Er) can be calculated using the equation: V.P. = $1/\sqrt{Er}$. Er for this cable calculates to be 1.077.

EXAMPLE 15

A slurry was mixed consisting of 7.36 g of PTFE in the form of a 60.0% dispersion and 13.67 gms of EXPANCEL - 091 DU and 4.5 g of distilled water. This yields a solids content of 35% PTFE to 65% EXPANCEL. The PTFE dispersion used was part number TE 30, an aqueous dispersion obtained from E. I. Dupont.

A 33 gauge silver plated copper wire was dipped coated with the above slurry by inserting the wire through a small hole in the bottom of the mix container and drawing the wire upwards through the bath. The wire was then hung vertically to dry for approximately 30 minutes at ambient conditions.

The 3.5 ft section of dried coated wire was inserted inside a 43 mil I.D. copper tube of the same length. The assembly was then placed in a convection oven for 4 minutes at 165° C. in order to puff the wire coating so that it fills the annular space between the wire and the copper tubing. The sample was removed and allowed to cool.

A Techtronics Model CSA 803 was used in TDR mode (time domain reflectometry) to measure velocity of propagation. A cable length of 3.240 ft was measured to have a signal delay of 1.037 ns/ft, which converts to a signal speed of $2.939 \times 10^8$ meters/sec. This signal speed divided by the speed of light in a vacuum ($2.998 \times 10^8$ m/s) yields a V.P. of 98.03%. From this value, the dielectric constant (Er) was calculated to be 1.041.

EXAMPLE 16

The following procedure was used for making films of ultra-high molecular weight polyethylene (UHMW-PE) containing 50% EXPANCEL - 091 DU by weight.

Solutions of UHMW-PE were prepared in a jacketed reaction vessel capable of maintaining solutions temperatures in excess of 130° C. The vessel was purged with flowing nitrogen. The vessel was also fitted with a thermocouple for determining the solution temperature, and a stirring paddle.

1. The vessel was initially heated to approximately 79° C., at which time 200 g of reagent grade mixed xylenes were added, and equilibrated at temperature.
2. To the stirring solvent, 4.0 g of Hostalon GUR 412 and EXPANCEL - 091 DU were slowly added. In addition, 0.04 g of an antioxidant, (IRGANOX 1010) was added.
3. With continued stirring, the temperature of the oil bath was raised to 123° C. Stirring was stopped when the solution temperature reached 117° C., and the stirring paddle was removed. The solution was allowed to equilibrate at temperature for 30 minutes.
4. After equilibration, the hot solution was poured into a glass dish, and loosely covered with aluminum foil. The foil was removed after 30 minutes, and the solvent evaporated overnight.

A piece of the resulting product from the above procedure was measured to be 4.70 cm long, 1.10 cm wide, and 0.358 cm thick, a weight of 0.570 g, and a calculated density of 0.308 g/cc. This piece was placed in a convection oven at 165° C. for 5 minutes and removed. The sample had a puffed appearance. A piece was cut from the puffed sample and was measured to be 8.92 cm long, 2.04 cm wide, and 0.767 cm thick, a weight of 0.534 g, and a calculated density of 0.038 g/cc.

EXAMPLE 17

The following example demonstrates ability to mold and/or selectively puff regions of a sample. A ½-20 inch threaded sleeve was placed between two heat platens set at 200° C. and allowed to reach temperature. A length was cut from the dried extruded beading of Example 4, part of which was inserted into the metal sleeve. After two minutes the sample was removed, the sleeve removed from the sample, and the following observations were made. The region of the sample that had been placed within the sleeve had a puffed outside diameter (O.D.) of ½ inch which matched the inside diameter (I.D.) of the sleeve including the threaded profile. The region which was not inserted within the metal sleeve had a smooth profile and an O.D. of approximately ⅛ inch.

EXAMPLE 18

The following example demonstrates the use of an additional filler with a microsphere/PTFE composite.

A 15% EXPANCEL/25% Carbon Black/60% PTFE by weight sample was made by the following method:

A slurry of 13.8 g of EXPANCEL - 091 DU, 23.07 g of Carbon Black, and 987 g of de-ionized water was prepared in a 2 liter baffled stainless steel container. While the slurry was agitating at 500 RPM for 3 minutes, 55.38 g of PTFE in the form of 20.0% dispersion was rapidly poured into the vessel now mixing at 800 RPM. The carbon black used was Ketjen Black type 300J obtained from Akzo Chemical, Inc. After a total of 1 minute 3 seconds, the mixer was stopped. The coagulum settled to the bottom of the vessel and the effluent was clear.

The coagulum was dried at 103° C. in convention oven. The dried cake was chilled below 0° C. It was hand ground through a 0.635 cm mesh screen again, tumbled, then allowed to sit at 18° C. for 16 hours and was re-tumbled.

A 2.54 cm diameter pellet was formed in a cylinder at 200 psi. The cylinder was heated to 100° C. and the pellet was then extruded through a 0.254 cm diameter die at a ram rate of 50.8 cm/min.

A 20 cm long piece of extrudate having a diameter of 0.302 cm was then placed in a convection oven at 165° C. for 3 minutes. Upon removal from the oven the sample was measured to be 21.2 cm long, having a diameter of 0.922 cm, and a weight of 0.989 gms with a calculated density of 0.070 g/cc.

The sample was tested for electrical resistivity using Mil G 83528A standard modified to a 4 point probe instead of a 2 point probe. During testing, the sample was compressed approximately 50%. The surface measurement was 110 ohms yielding a volume resistivity of 191 ohm-cm. An alternative testing method was also used by attaching alligator clips to the sample at a 4 inch spacing. This test yielded a result of 241 ohm-cm. A z-axis test was measured between two plates and also compressed 50%. This test yielded a result of 5.7 ohm-cm.

It should be noted that the compositions of the present invention can be formed with various fillers to provide specific utility. Examples of possibly suitable fillers include: carbon black, ceramics, chemically activated materials (e.g. silica gel, activated carbon), thermoplastics, metals, metal oxides, elastomers particulates (including particles, rods, or flakes), etc.

EXAMPLE 19

A coagulum was prepare as in Example 6. The coagulum was dried at 110° C. in a convection oven. The dried cake was chilled below 0° C. It was hand ground through a 0.635 cm mesh stainless steel screen. The screened powder was lubricated with mineral spirits at a ratio of 0.265 c solvent per gram of powder. The mixture was chilled, passed through a 0.635 mesh screen again, tumbled, then allowed to sit at 18° C. for 16 hours and was retumbled.

A 10 cm diameter pellet was formed in a cylinder at 200 psi and then extruded through a 0.203 × 15.2 cm die at a ram rate of 100 cm/min. The extruded tape was allowed to air dry in ambient conditions overnight.

A piece of the dried extrudate was cut and measured to be 15.2 cm long, 14.0 cm wide, and 0.0206 cm thick. The piece was placed in a convection oven at 165° C. for 6 minutes to puff the material. Upon removal from the oven, the piece measured to be 39.8 cm long, 27.8 cm wide, and 0.940 cm thick, thus showing growth in the length (x), width (y), and thickness (z) dimensions. The ratio of growth in the x direction was 2.6, in the y direction was 2.8, and in the z direction was 4.6.

Comparative tensile properties of the before and after puffed materials were performed using ASTM D882 test method for the x and y dimensions, and ASTM D952 for the z dimension. All of the samples tested were of the same cut x and y dimensions, however, since the samples grew significantly in all dimensions when puffed, it was necessary to normalize the data to account for this growth in order to simulate the total strength gained by the entire sample.

For the x-direction tensile measurements, the puffed tensile value must be multiplied by the ratio of y-direction growth in order to normalize the data ("normalizing ratio"). Conversely, for the y-direction tensile measurements the puffed tensile value must be multiplied by the ratio of x-direction growth in order to normalize the data. For the z-direction tensile measurements, the puffed tensile value must be multiplied by the product of the ratios of both the x and y direction growth in order to normalize the data. The following table shows the raw and normalized data for the tensile tests.

|   | Stress at max load pre-puff (lbs. force) | Stress at max load puffed (lbs. force) | Normal-izing ratio | Normalizing stress at max load puffed (lbs. force) |
|---|---|---|---|---|
| X | 5.35 | 3.68 | 2.8 | 10.3 |
| Y | 13.0 | 6.95 | 2.6 | 18.1 |
| Z | 29.9 | 29.1 | 7.3 | 212.4 |

By comparing the stress at maximum load of the pre-puffed sample versus the normalized stress at maximum load of the puffed sample, it is demonstrated that total strength of the sample has increased in all dimensions.

It should be evident from the above description and examples that the present invention has virtually endless possible applications. A mere sampling of other suggested uses for the present invention include: water-repellent/breathable (w/b) laminates with a variety of new textures; w/b laminates with puncture resistance (due to its depth and resilience); "quiet" w/b laminates, without the "crinkle" sound now encountered with some expanded PTFE laminates; shock absorbing w/b materials—for footwear soles, etc.; life jackets and other buoyant products; etc. Moreover, since in some instances the present invention can be implemented far more efficiently than existing methods for expanding PTFE, it likewise lends itself to many applications demanding product disposability, such as in medical supplies and equipment.

Although particular embodiments of the present invention are disclosed herein, it is not intended to limit the invention to such a disclosure and changes and modifications may be incorporated and embodied within the scope of the following claims.

The invention claimed is:

1. A composition which comprises:
   a composite of ultrahigh molecular weight polyethylene and expandable microspheres;
   wherein the composite comprises a thread including unexpanded microspheres therein, the microspheres being adapted to expand the composite into a coherent mass of microspheres, polymeric nodes and interconnecting fibrils, and air spaces when exposed to an energy source once incorporated into a seam.

2. The composition of claim 1 wherein the coherent mass comprises a scaffold structure expanded substantially in three dimensions.

3. The composition of claim 1 wherein the air spaces within the coherent mass comprises at least 10% of the volume of the coherent mass.

4. The composition of claim 3 wherein the air spaces within the coherent mass comprises at least 50% of the volume of the coherent mass.

5. The composition of claim 4 wherein the air spaces within the coherent mass comprises at least 80% of the volume of the coherent mass.

6. The composition of claim 1 wherein the coherent mass is resilient to deformation.

7. The composition of claim 6 wherein the coherent mass will withstand a compressive force to at least 50% of its thickness with nearly 100% rebound to its original thickness upon removal of the compressive force.

8. The composition of claim 1 wherein the coherent mass has a density of $\leqq 0.5$ g/cc.

9. The composition of claim 1 wherein the coherent mass has a density of $\leqq 0.2$ g/cc.

10. The composition of claim 1 wherein the coherent mass has a density of $\leqq 0.05$ g/cc.

11. The composition of claim 1 wherein a filler is included therein.

12. A composition which comprises:
    a composite of ultrahigh molecular weight polyethylene and expandable microspheres;
    wherein the composite is a coherent, resilient mass of microspheres, polymeric nodes and interconnecting fibrils, and air spaces; and
    wherein the composition is formed as a thread, the thread being resilient to deformation when incorporated into a seam so as to resist leakage through seam holes.

13. An improved method for use in forming sealed seams with minimal leakage therethrough which comprises:
    providing a thread containing a polymer resin and unexpanded microspheres, the microspheres being adapted to expand significantly when exposed to an energy source, the polymer resin selected from the group consisting of polytetrafluoroethylene or ultra-high molecular weight polyethylene;
    forming a seam with the thread;
    sealing the seam by exposing the thread to the energy source to cause the microspheres to expand and increase the width of the thread.

14. The method of claim 13 which further comprises providing a polymer resin consisting of polytetrafluoroethylene (PTFE).

15. The method of claim 13 which further comprises reinforcing the thread with a separate sheath surrounding the polymer resin.

16. The method of claim 13 which further comprises forming the polymer resin around a separate interior core.

17. The method of claim 16 which further comprises providing an interior core which is conductive of microsphere expansion energy; and
    exposing the thread to microsphere expansion energy at least in part by passing such energy through the conductive core.

18. The method of claim 13 which further comprises:
    providing microspheres which expand when subjected to heat energy; and
    heating the thread to cause it to increase in size.

19. A thread suitable for creating a sewn seam which comprises:
    a polymer selected from the group consisting of polytetrafluoroethylene or ultra-high molecular weight polyethylene;
    a composite of the polymer and expandable microspheres, said mixture comprising a lattice of nodes and fibrils of polymer with microspheres embedded therein; and
    means to reinforce said thread to resist breakage of the thread upon exertion of force along the thread's longitudinal dimension.

20. The thread of claim 19 wherein the means to reinforce the thread comprises a core embedded within the composite.

21. The thread of claim 19 wherein the means to reinforce the thread comprises a strong core of polytetrafluoroethylene material.

22. The thread of claim 19 wherein the means to reinforce the thread comprises a sheath surrounding the composite.

23. A composition which comprises:
   a composite of polytetrafluoroethylene and expandable microspheres;
   wherein the composite comprises a thread including unexpanded microspheres therein, the microspheres being adapted to expand the composite into a coherent mass of microspheres, polymeric nodes and interconnecting fibrils, and air spaces when exposed to an energy source once incorporated into a seam.

24. A composition which comprises:
   a composite of polytetrafluoroethylene (PTFE) and expandable microspheres;
   wherein the composite is a coherent, resilient mass of microspheres, polymeric nodes and interconnecting fibrils, and air spaces; and
   wherein the composition is formed as a thread, the thread being resilient to deformation when incorporated into a seam so as to resist leakage through seam holes.

* * * * *